(12) United States Patent
Lam et al.

(10) Patent No.: US 10,869,022 B2
(45) Date of Patent: Dec. 15, 2020

(54) AUTOSTEREOSCOPIC MULTI-VIEW DISPLAY SYSTEM AND RELATED APPARATUS

(71) Applicant: City University of Hong Kong, Kowloon (HK)

(72) Inventors: Miu Ling Lam, Kowloon (HK); Bin Chen, Kowloon (HK); Lingyan Ruan, Kowloon (HK)

(73) Assignee: City University of Hong Kong, Kowloon (HK)

( * ) Notice: Subject to any disclaimer, the term of this patent is extended or adjusted under 35 U.S.C. 154(b) by 62 days.

(21) Appl. No.: 15/927,312

(22) Filed: Mar. 21, 2018

(65) Prior Publication Data

US 2019/0297317 A1     Sep. 26, 2019

(51) Int. Cl.
*H04N 13/32* (2018.01)
*H04N 13/327* (2018.01)
*H04N 13/351* (2018.01)

(52) U.S. Cl.
CPC ........... *H04N 13/32* (2018.05); *H04N 13/327* (2018.05); *H04N 13/351* (2018.05)

(58) Field of Classification Search
CPC .... H04N 13/32; H04N 13/327; H04N 13/351; H04N 13/354; H04N 13/363
See application file for complete search history.

(56) References Cited

U.S. PATENT DOCUMENTS

| | | | | |
|---|---|---|---|---|
| 8,390,677 B1* | 3/2013 | Said | ..................... | H04N 13/305 348/51 |
| 2002/0135673 A1* | 9/2002 | Favalora | ................ | G02B 30/50 348/42 |
| 2007/0177275 A1* | 8/2007 | McGuire, Jr. | .......... | G02B 17/08 359/630 |
| 2008/0297593 A1* | 12/2008 | Debevec | ............. | H04N 13/366 348/51 |
| 2010/0033680 A1* | 2/2010 | Krijn | ..................... | G02B 30/27 353/8 |
| 2016/0073100 A1* | 3/2016 | Huang | ................ | H04N 13/354 353/7 |

* cited by examiner

*Primary Examiner* — Farzana Hossain
(74) *Attorney, Agent, or Firm* — Renner Kenner Greive Bobak Taylor & Weber

(57) ABSTRACT

An autostereoscopic multi-view display system includes a projector; a display; and a reflector arranged to reflect light rays projecting from the projector onto the display for providing a multi-view image on the display.

30 Claims, 15 Drawing Sheets

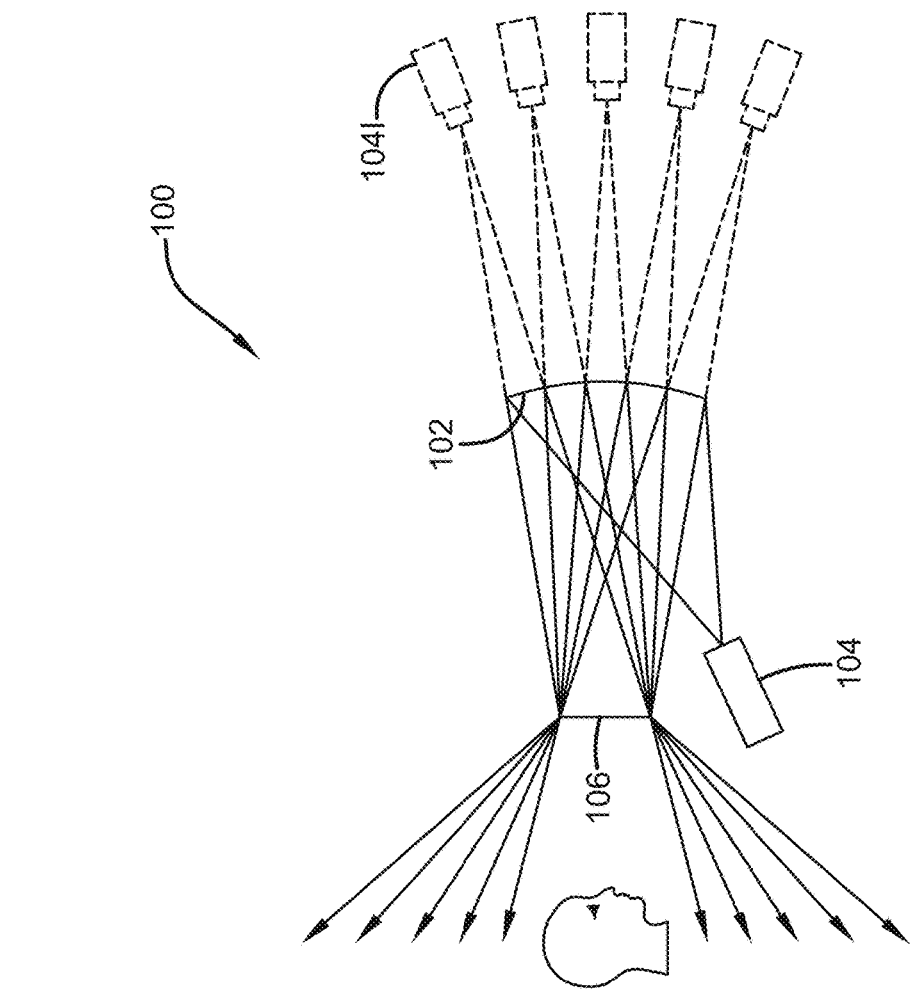
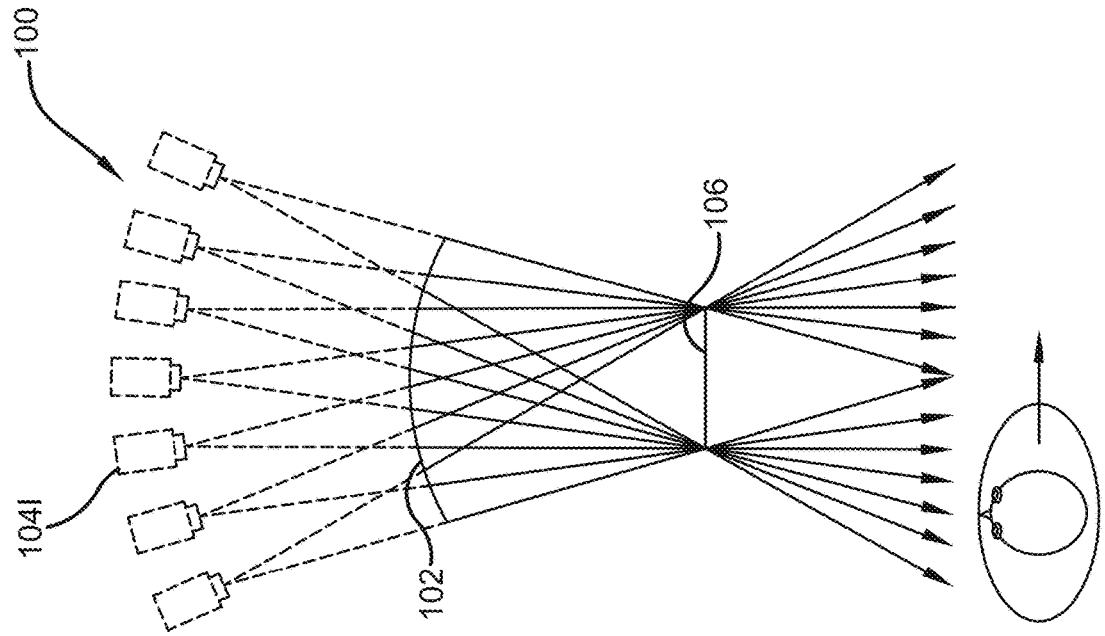

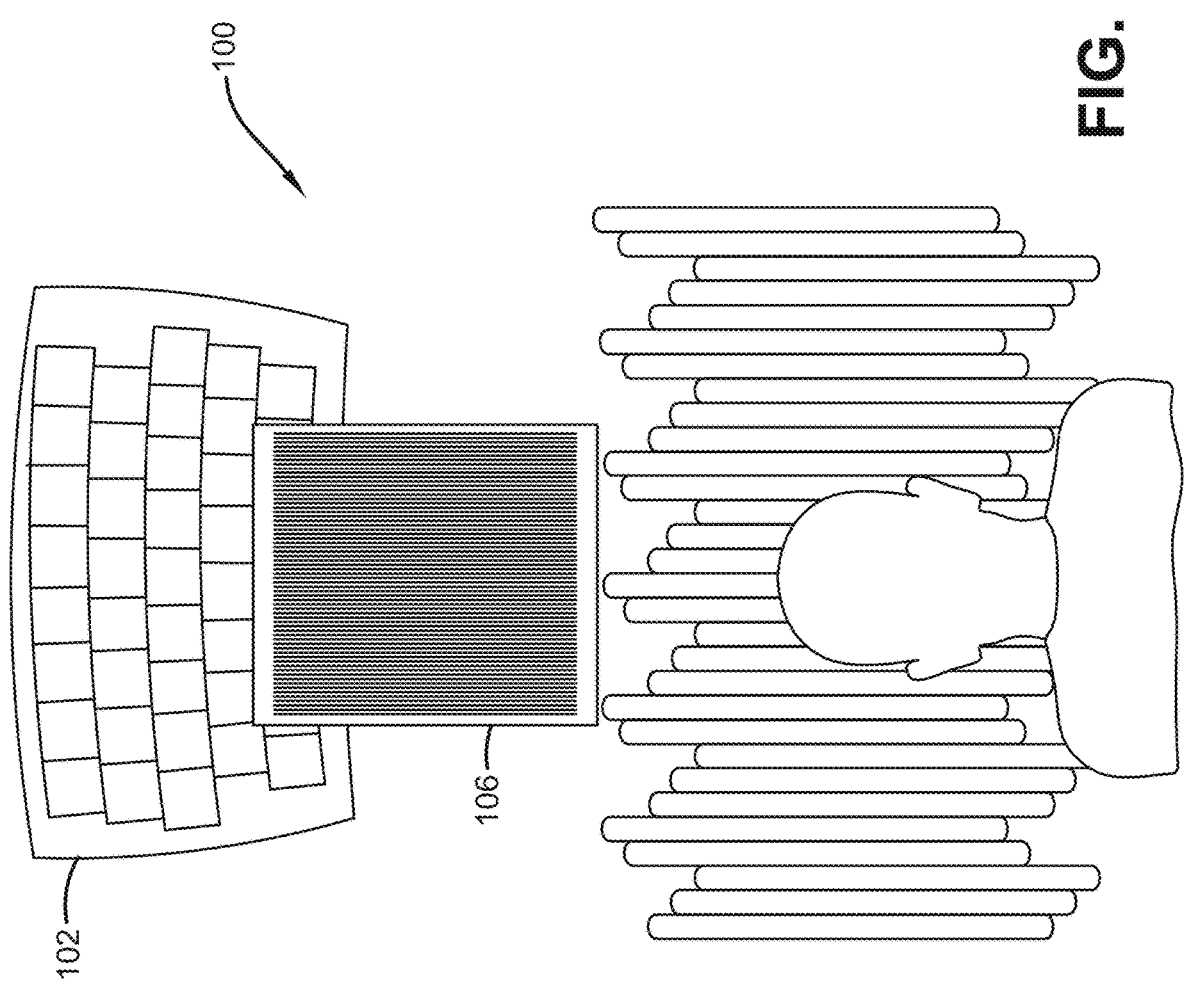

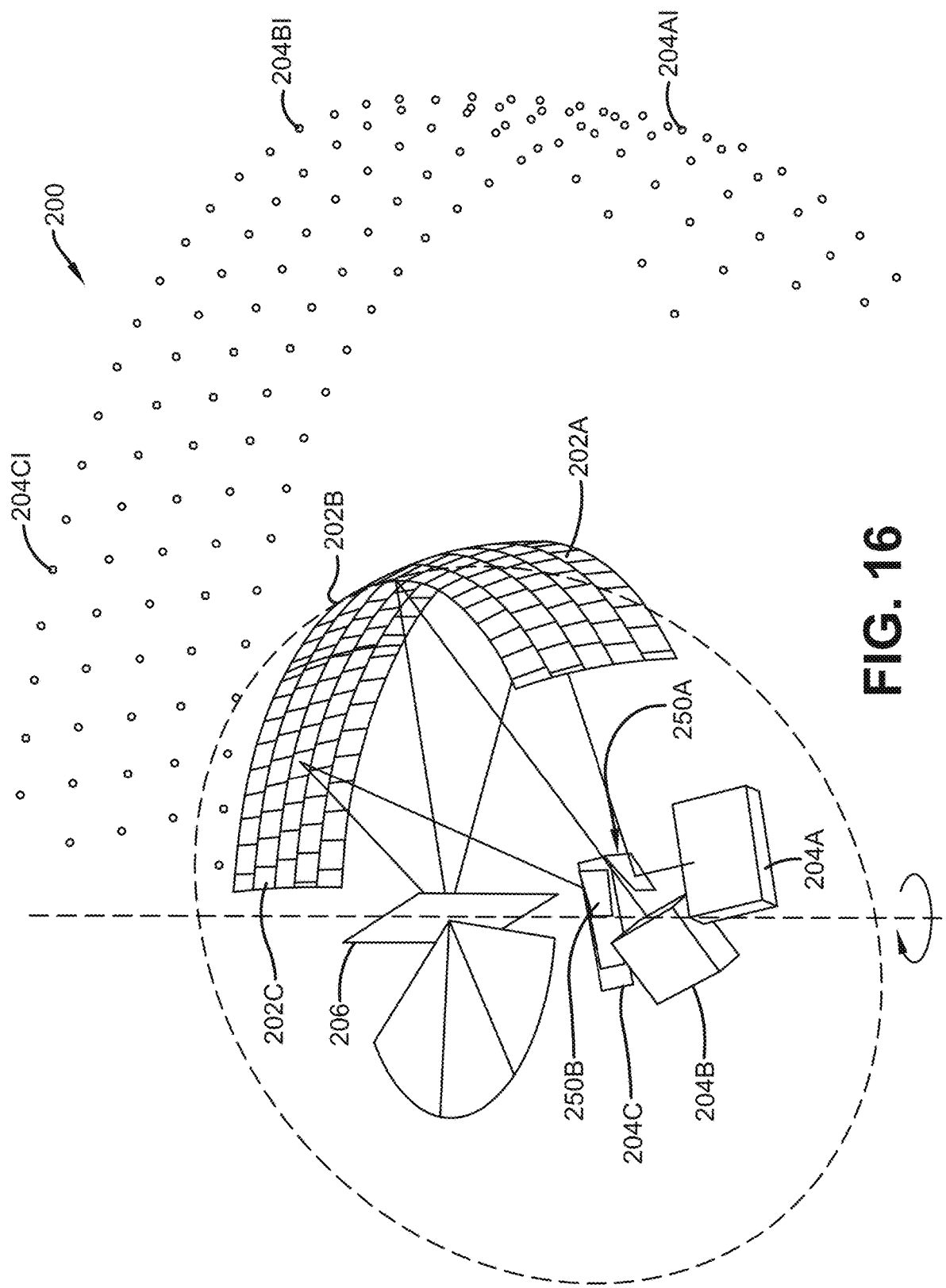

AUTOSTEREOSCOPIC MULTI-VIEW DISPLAY SYSTEM AND RELATED APPARATUS

TECHNICAL FIELD

The invention relates to an autostereoscopic multi-view display system, and in particular, a reflector-based autostereoscopic multi-view display system.

BACKGROUND

Ideally, a three-dimensional display should allow multiple viewers to perceive depth information naturally, rapidly and accurately without the need for special eyewear or eye tracking system. The recent emergence of automultiscopic displays using projector arrays and holographic diffusers shows promising results in achieving this challenging goal. However, such approach requires a massive number of projectors to emit light from many different directions. Also, these systems involve high system costs, complicated set-up, and laborious calibrations. The angular resolution is also limited by the physical size of projectors.

SUMMARY OF THE INVENTION

In accordance with a first aspect of the invention, there is provided an apparatus for an autostereoscopic multi-view display system, comprising: a reflector arranged to reflect light rays projecting from a projector onto a display for providing a multi-view image on the display.

In one embodiment of the first aspect, the reflector is arranged to provide a reflection surface that is shaped generally to correspond to a surface of an ellipsoid.

In one embodiment of the first aspect, the reflector comprises a reflector array with a plurality of reflector elements, each arranged to reflect light rays projecting from the projector onto the display for providing a sub-image of the multi-view image. Preferably, each sub-image is a 2D slice of a 4D light field.

In one embodiment of the first aspect, the size of the reflector elements is substantially the same. However, in other embodiments, their sizes may differ.

In one embodiment of the first aspect, the reflector elements are formed integrally. In another embodiment of the first aspect, the reflector elements are attached to each other. Preferably, the reflector elements are attached in a manner that is substantially gapless.

In one embodiment of the first aspect, the reflector is arranged such that respective distances travelled by light rays from the projector via respective one of the reflector elements to the display are identical.

In one embodiment of the first aspect, each of the reflector elements comprises a planar reflection surface.

In one embodiment of the first aspect, the reflector is arranged such that the planar reflection surface of each of the reflector elements are each tangential to a surface of an imaginary ellipsoid, with the projector and the display arranged at a respective focal point of the imaginary ellipsoid. Preferably, the projector is at a focal point of the imaginary ellipsoid and a center of the display is on the focal point of the imaginary ellipsoid.

In one embodiment of the first aspect, each of the reflector elements comprises a curved reflection surface.

In one embodiment of the first aspect, the reflector is arranged such that the curved reflection surface of each of the reflector elements is shaped to correspond to a surface of an imaginary ellipsoid with the projector and the display arranged at a respective focal point of the imaginary ellipsoid. Preferably, the projector is at a focal point of the imaginary ellipsoid and a center of the display is on the focal point of the imaginary ellipsoid.

In one embodiment of the first aspect, the reflector array is a one-dimensional array with one row or one column.

In one embodiment of the first aspect, the reflector array is a two-dimensional array with one or more rows and one or more columns.

In one embodiment of the first aspect, the reflector array comprises a plurality of rows, each of which is offset with respect to the others.

In one embodiment of the first aspect, the offset is equal to an angular resolution of the display.

In one embodiment of the first aspect, the number of columns in is determined based on $$m = \frac{W}{w'}$$

where W is a horizontal resolution of the projector and w' is horizontal spatial resolution of the display.

In one embodiment of the first aspect, the number of rows n is determined based on $$\varphi \leq \frac{\theta_d}{n(m-1)} \text{ and } n = \frac{H}{h}$$

where m is the number of columns, $\varphi$ is angular resolution of the display, $\theta_d$ is a horizontal FOV of the display, His a vertical resolution of the projector, h is a vertical spatial resolution of the display.

In one embodiment of the first aspect, the reflector elements are mirrors.

In accordance with a second aspect of the invention, there is provided an autostereoscopic multi-view display system, comprising: a projector; a display; and a reflector arranged to reflect light rays projecting from the projector onto the display for providing a multi-view image on the display.

In one embodiment of the second aspect, the reflector comprises a reflector array with a plurality of reflector elements, each arranged to reflect light rays projecting from the projector onto the display for providing a sub-image of the multi-view image. Preferably, each sub-image is a 2D slice of a 4D light field.

In one embodiment of the second aspect, the reflector, the projector, and the display are arranged such that respective distances travelled by light rays from the projector via respective one of the reflector elements to the display are identical.

In one embodiment of the second aspect, the distance d travelled by light rays from the projector via the reflector element to the display is defined by:

$$d = \frac{x}{2\tan(\theta_p/2m)}$$

where x is a horizontal size of the display defined by a horizontal spatial resolution of the display divided by pixel density of the display, in is the number of columns of the reflector array, $\theta_p$ is a horizontal FOV of the projector.

In one embodiment of the second aspect, each of the reflector elements comprises a planar reflection surface; and the reflector is arranged such that the planar reflection surface of each of the reflector elements are each tangential to a surface of an imaginary ellipsoid, with the projector and the display arranged at a respective focal point of the imaginary ellipsoid. Preferably, the projector is at a focal point of the imaginary ellipsoid and a center of the display is on the focal point of the imaginary ellipsoid.

In one embodiment of the second aspect, each of the reflector elements comprises a curved reflection surface; and wherein the reflector is arranged such that the curved reflection surface of each of the reflector elements is shaped to correspond to a surface of an imaginary ellipsoid with the projector and the display arranged at a respective focal point of the imaginary ellipsoid. Preferably, the projector is at a focal point of the imaginary ellipsoid and a center of the display is on the focal point of the imaginary ellipsoid.

In one embodiment of the second aspect, the reflector array is: a one-dimensional array with one row or one column; or a two-dimensional array with one or more rows and one or more columns.

In one embodiment of the second aspect, the reflector array comprises a plurality of rows, each of which is offset with respect to the others; and the offset is equal to an angular resolution of the display.

In one embodiment of the second aspect, the number of columns in is determined based on $$m = \frac{W}{w'}$$

where W is a horizontal resolution of the projector and w' is horizontal spatial resolution of the display; and wherein the number of rows n is determined based on $$\varphi \leq \frac{\theta_d}{n(m-1)} \text{ and } n = \frac{H}{h}$$

where m is the number of columns, $\varphi$ is angular resolution of the display, $\theta_d$ is a horizontal FOV of the display, H is a vertical resolution of the projector, h is a vertical spatial resolution of the display.

In one embodiment of the second aspect, the reflector elements are mirrors.

In one embodiment of the second aspect, the reflector is arranged to provide a reflection surface that is shaped generally to correspond to a surface of an ellipsoid.

In one embodiment of the second aspect, the display comprises a screen with an anisotropic diffuser. The screen may be a fog screen or display.

In one embodiment of the second aspect, the anisotropic diffuser comprises a vertical anisotropic diffuser.

In one embodiment of the second aspect, the projector comprises a video projector, which is preferably a high resolution video projector.

In accordance with a third aspect of the invention, there is provided a method for designing the apparatus of the first aspect, the method comprises: determining one or more properties of the projector; determining one or more target parameters of the display; and determining a construction of the reflector based on the one or more properties of the projector and the one or more target parameters of the display.

In one embodiment of the third aspect, the one or more properties of the projector comprise one or more of: a horizontal FOV $\theta_p$ of the projector; and a resolution (W×H) of the projector.

In one embodiment of the third aspect, the one or more target parameters of the display comprises one or more of: a target horizontal spatial resolution $\omega$ of the display, a target pixel density $\rho'$ of the display, a target angular resolution $\varphi$ of the display, and a target horizontal FOV $\theta_d$ of the display.

In one embodiment of the third aspect, determining a construction of the reflector comprises determining construction of the reflector elements of the reflector elements.

In one embodiment of the third aspect, the method further comprises determining a size of the reflector elements.

In one embodiment of the third aspect, the method further comprises determining the number of rows of the reflector elements and the number of columns of the reflector elements.

In one embodiment of the third aspect, the method further comprises determining actual parameters of the display based on the determined construction of the reflector.

In one embodiment of the third aspect, the actual parameters of the display comprise one or more of: a spatial resolution w' of the display, a vertical size y of the display, a corrected pixel density $\rho'$ of the display.

In one embodiment of the third aspect, the method further comprises determining a distance travelled by light rays from the projector via the reflector to the display.

In one embodiment of the third aspect, the method further comprises determining an optimal projector-reflector distance.

In one embodiment of the third aspect, the method further comprises determining a spatial arrangement relationship among the projector, the reflector, and the display.

In accordance with a fourth aspect of the invention, there is provided a system for implementing the method of the third aspect, the system comprising means for determining one or more properties of the projector; means for determining one or more target parameters of the display; and means for determining a construction of the reflector based on the one or more properties of the projector and the one or more target parameters of the display.

In accordance with a fifth aspect of the invention, there is provided a non-transitory computer readable medium for storing computer instructions that, when executed by one or more processors, causes the one or more processors to perform the method of the third aspect.

In accordance with a sixth aspect of the invention, there is provided a method for calibrating an autostereoscopic multi-view display system such as that in the second aspect of the invention, comprising: (a) imaging, using a camera, a printed image arranged on the display for use as a reference image; (b) projecting, using the projector, an image identical to the printed image for reflection by the reflector onto the display; (c) imaging, using the camera, the projected image; (d) determining a homography between the reference image and the projected image imaged by the camera; and (e) determining a calibrated projection image for projection using the autostereoscopic multi-view display system based on the determined homography.

In one embodiment of the sixth aspect, the display comprises reflector comprises a reflector array with a plurality of reflector elements, each arranged to reflect light rays projecting from the projector onto the display for providing a sub-image of the multi-view image; and wherein step (b) comprises sequentially projecting the image identical to the printed image to each of the reflector elements.

In one embodiment of the sixth aspect, step (d) comprises: calculating a homography matrix between the reference image and the images based on correspondence between the detected corner points on the two sets of images.

In one embodiment of the sixth aspect, step (e) comprises: multiplying the reference image and the determined homography to obtain calibrated images corresponding to the imaged images.

In one embodiment of the sixth aspect, step (e) further comprises: adding all calibrated images to obtain the calibrated projection image.

BRIEF DESCRIPTION OF THE DRAWINGS

Embodiments of the invention will now be described, by way of example, with reference to the accompanying drawings in which:

FIG. 1B is the top view of the autostereoscopic multi-view display system in FIG. 1A;

FIG. 1C is the side view of the autostereoscopic multi-view display system in FIG. 1A;

m FIG. 1D is a schematic diagram illustrating the viewing zone of a user of the autostereoscopic multi-view display system in FIG. 1A;

FIG. 16 is a schematic diagram illustrating an autostereoscopic multi-view display system in accordance with another embodiment of the invention.

DETAILED DESCRIPTION OF THE PREFERRED EMBODIMENT

The invention relates to an autostereoscopic multi-view display system that includes a projector, a display, and a reflector that is arranged to reflect light rays projecting from the projector onto the display for providing a multi-view image on the display. The invention also relates to a reflector for an autostereoscopic multi-view display system, and related design and calibration method.

In the following description, a high-resolution video projector is used as the projector, a vertical anisotropic diffuser screen is used as a display, and mirrors forming multiple reflection elements are used as a reflector. Preferably, the components in the system are arranged and positioned based on an ellipsoidal model described below; and the construction of the reflector is based on the ellipsoidal model.

A. Display Principle

Figure 1A:
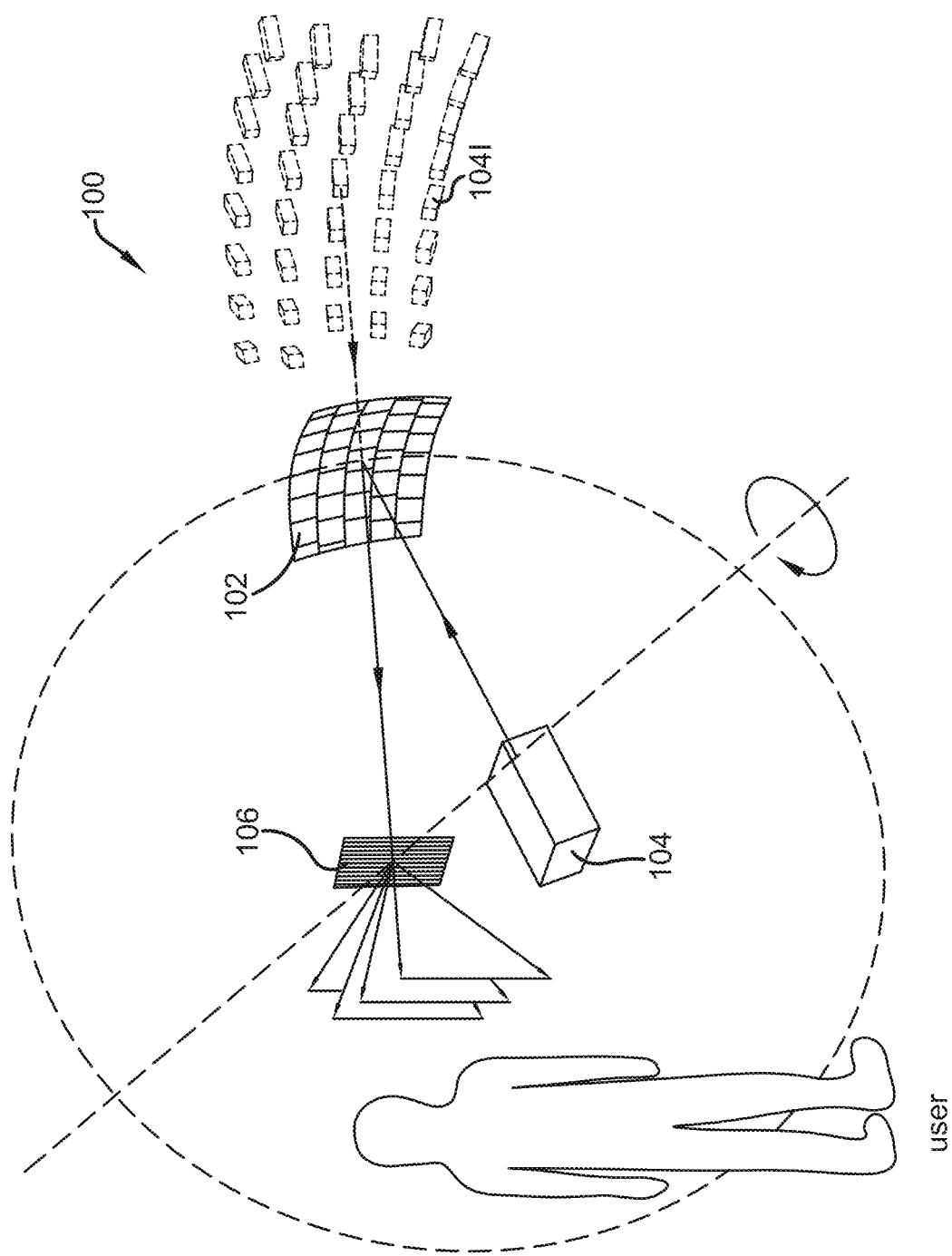
FIG. 1A is a schematic diagram of an autostereoscopic multi-view display system in accordance with one embodiment of the invention.
Figure 6:
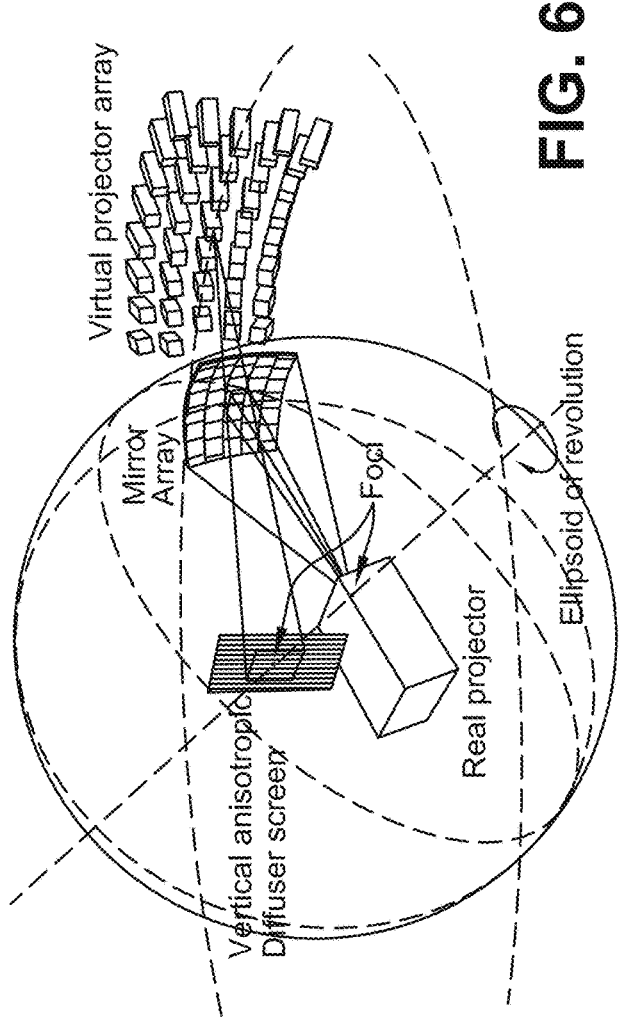
FIG. 6 is a schematic diagram showing an exemplary simulated arrangement of the reflector, the display, and the projector in the autostereoscopic multi-view display system of FIG. 1A.

FIGS. 1A-1C illustrate an autostereoscopic multi-view display system 100 in one embodiment of the invention. In this system 100, a video projector 104 is arranged to emit light rays onto a reflector 102 formed by an array of planar mirrors. Each mirror reflects an image slice (sub-image of the entire projection) onto a holographic diffuser display screen 106, for view by a user at the side of the screen opposite to the side with the mirror array reflector 102. The mirrors are tangential to an ellipsoid of revolution that has the projector 104 and the screen 106 center located at its two respective focal points (foci). In the illustration, the major axis of the ellipsoid is generally upright but this is not essential. Ellipsoid inherits an important geometric property of ellipse, that is, the total length from one focal point to the other through any surface points is constant. Therefore, in the system 100, the total length of any light ray emitted from the projector 104 reflected off the mirror array reflector 102 onto the screen 106, defined as the projection distance, is constant. This geometric arrangement is preferred as it can ensure uniform scale, size, and sharpness of every reflected image slice. FIG. 6 shows the corresponding simulated arrangement.

In the embodiment of FIGS. 1A-1C, the mirror array reflector 102 is arranged to mimic a dense array of virtual projectors 104I. Preferably, each mirror in the array is tangential to the ellipsoid of revolution that has a real projector 104 and the center of a holographic screen 106 located at its foci. As a result, all virtual projectors 104I have the same distance from the screen 106 center. Preferably, the vertical anisotropic diffuser screen 106 has small horizontal and large vertical angles of diffusion. The angular density of the display 106 can be multiplied by offsetting different rows of the mirror arrays with a fixed angular interval, as will be discussed further below.

The mirror array set-up can also be considered as an optical system that reproduces an array of virtual projectors that exist in the virtual space and have equal distance from the screen 106. All virtual projectors 104I are distributed on the surface of a sphere with the screen 106 at the centre. The number of virtual projectors 104I is the same as the number of mirrors in the array. Each virtual projector 104I is projecting a different image slice from a specific angle onto the screen 106 through a 'window'—the mirror that produces the virtual projector itself.

All image slices overlap on the display screen 106. Preferably, the display m screen 106 is made with a sheet of vertical anisotropic diffuser with small horizontal and large vertical angles of diffusion. The narrow horizontal scattering profile will maintain the divergence of different projector pixels to various horizontal views. The horizontal angle of diffusion is preferably chosen to be the same as or close to the target angular resolution of the display 106 so that the gaps between views are just filled but the rays of different views are not over-blended. The wide vertical scattering profile can deliver the same pixel to multiple heights so that 3D imagery can be seen regardless of viewer's height. Holographic diffusers that are commercially available may be used.

In this embodiment, each viewing position will receive a unique set of rays coming from many different virtual projectors 104I and allow a mosaicked image to be observed only at that viewing angle. Thus, the display 106 can achieve autostereoscopy by sending a stereo-pair to the viewer's left and right eyes and allowing him/her to perceive three-dimensionality through binocular parallax. When the viewer moves around in front of the screen, as shown in FIG. 1D, a number of multi-perspective images are fused in the viewer's brain which induces motion parallax and further enhances the 3D experience. Multiple viewers at distinct locations can perceive the depth cues simultaneously.

B. System Design

The ellipsoidal model in the present embodiment provides a geometric framework for the system. However, since there exists many candidate ellipsoids, the display has numerous inter-related design parameters, practical constraints due to hardware and fabrication factors, a detailed system design is required to best implement the system of FIG. 1. The following provides design procedures and methodologies for the system of FIG. 1 in one embodiment of the invention.

Step 1: Define Preliminary Target Parameters

The primary goal of this step is to define a set of requirements which are the m desired performance measures for the target display. Without loss of generality, it is assumed that these system parameters and constraints are known:

1. Projector Horizontal FOV $\theta_p$

This can be obtained from the product specification, but the actual value may vary from the one given in the product specification. In practice, measurement of this value is recommended and such measurement can be performed relatively easily. In general, a wider $\theta_p$ will result in a wider viewable angle of the 3D display. Thus, it may be desirable to choose a projector with wide FOV, using the maximum zoom or adding a projector lens.

2. Projector Resolution W×H

The system preferably includes a high-resolution projector because its pixels are split into multi-views. Full HD and 4K projectors are used in the following embodiments.

3. Maximum Mirror Array Size $m_x \times m_y$

In cases where the mirror array is fabricated by generating the 3D model of the mirror support structure and printing it out with 3D printer, the build envelop of the printer would limit the overall size of the mirror array. In some cases, it may be desirable to constrain the mirror size to reduce fabrication cost and overall system size.

Next, decide the following target parameters of the display:

1. Horizontal spatial resolution $\omega$
2. Horizontal angular resolution $\varphi$ This parameter is important as it determines whether the display can successfully create convincing parallax depth cues. According to previous studies, for humans, normal interpupillary distance is about 50 mm to about 75 mm. To create binocular disparity, the angular resolution should be high enough to separate a pair of stereo images for both eyes by taking the viewing distance into account. For example, the minimum $\phi$ to ensure binocular disparity is around 6° for 0.5 m viewing distance; and around 1° for 3 m viewing distance. A small $\phi$ value will also help viewers to obtain more different angular views when they move, or perceive different views even when the movement is small, thus enhancing motion parallax sensation. The horizontal diffusion of the anisotropic diffuser screen is preferably chosen to match the target angular resolution.

3. Pixel density $\rho$, thus horizontal image size $I_x = \omega/\rho$
4. Number of columns of reflector elements (e.g., mirrors) $m \in Z$, which can be computed by $m = \lfloor W/w \rfloor$
5. Corrected horizontal spatial resolution $w' = W/m$ and corrected pixel density $\rho' = w'/I_x$ based on the chosen m
6. Virtual projector horizontal FOV $\theta_{vp} = \theta_p/m$
7. Projection distance $d = I_x/2 \tan(\theta_{vp}/2)$ This step confirms the column and row numbers of the mirror array m×n required to achieve the target specifications, and fine-tunes the display's horizontal spatial resolution and the pixel density in order to distribute W evenly to m mirrors.

The ellipsoid major axis, which equals to the projection distance d, is also fixed. However, there still remains two degrees of freedom in the system. First, the focal distance f (or projector-screen distance) is yet to be determined. Once it is confirmed, the shape of the ellipsoid is established. Second, the distance between the projector and the mirror, denoted by L, has to be determined in order to locate the mirror array on the ellipsoid model.

Step 2: Find Projector-Mirror Distance and Optimal Display FOV

The horizontal FOV $\theta_d$ of the display is the viewable angle of the 3D display, which is defined as the intersection angle between the principal axes of the two outermost virtual projectors at both sides. The required size of the mirror array increases with $\theta_d$. Given the fabrication constraints $m_x \times m_y$, the largest possible $\theta_d$ that can be yielded can be obtained. The actual display FOV can be further fine-tuned.

Figures 2A, 2B:
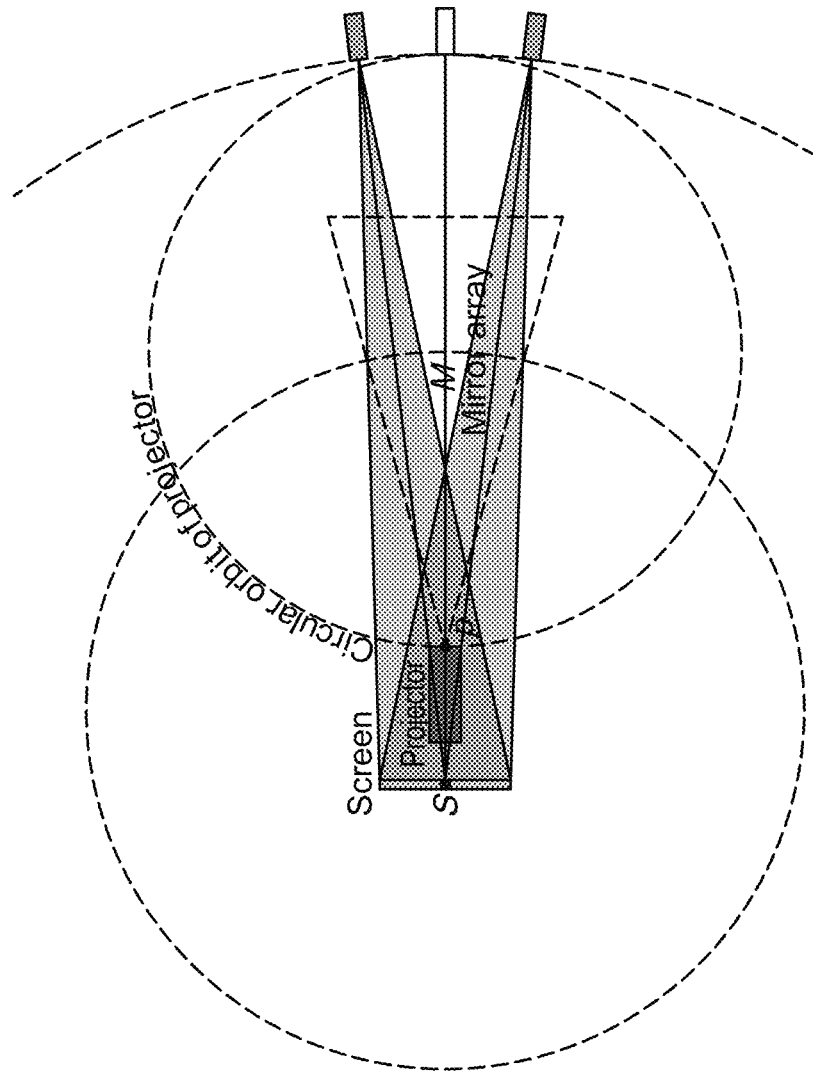
FIG. 2A is a schematic diagram (top view) illustrating an optimal system geometry for obtaining the largest display FOV $\theta_d$ from the given mirror array width $m_x$ for the system of FIG. 1A.
FIG. 2B is a schematic diagram (side view) of the illustration of FIG. 2A.

As shown in FIGS. 2A and 2B, in $\triangle OPQ$, $PQ(l_1)$ equals to the projector-mirror distance, which can be computed as:

$$l_1 = \frac{m_x}{2\sin\frac{\theta_p}{2}} \quad (1)$$

Since Q is a point on the ellipse, we have $QS=d-l_1$.
In $\triangle OQS$, $$l_2 = OS = \sqrt{QS^2 - OQ^2} = \sqrt{(d-l_1)^2 - \left(\frac{m_x}{2}\right)^2} \quad (2)$$

Thus, we can obtain the optimal ellipse with major axis equal d and focal distance:

$$PS = OS - OP = l_2 - \frac{m_x}{2\tan\frac{\theta_p}{2}} \quad (3)$$

In $\triangle ORT$, $$l_3 = RQ = \sqrt{RT^2 + QT^2} = \sqrt{l_2^2 + \left(\frac{m_x - l_x}{2}\right)^2} \quad (4)$$

Since $RS \parallel QO \parallel VX$, we have $$SX = \frac{SO \cdot RV}{RQ} = \frac{l_2 \cdot (l_1 + l_3)}{l_3} \quad (5)$$

Therefore, the horizontal FOV of the display $\theta_d$ can be obtained by $\triangle SVX$ $$\theta_d = 2\cos^{-1}\frac{l_2 \cdot (l_1 + l_3)}{d \cdot l_3} \quad (6)$$

Step 3: Determine Projector Tilt Angle

After acquiring the parameters in the previous Steps, the system remains one degree of freedom, which is the focal distance f (i.e. projector-screen distance). This allows further optimization of the geometric model under other realistic constraints. In the following, two importance constraints are first described, then ways to optimize the system structure under these constraints will be provided.

Projector Occlusion and Collision

Figures 3, 4:
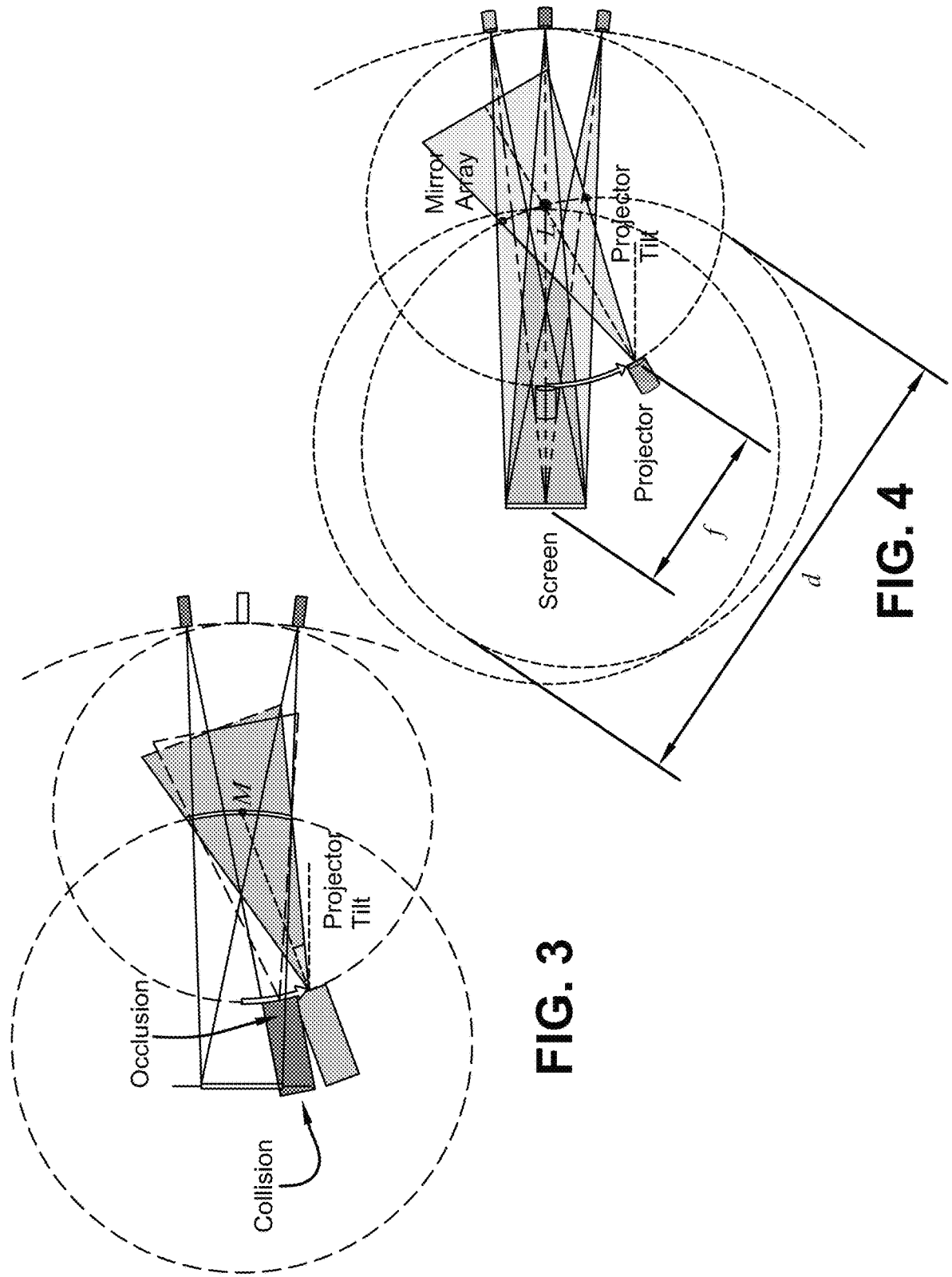
FIG. 3 is a schematic diagram illustrating occlusion and collusion constrains for the geometric model of FIG. 2A.
FIG. 4 is a schematic diagram illustrating a preferred (occlusion-free and collision-free) arrangement for the autostereoscopic multi-view display system of FIG. 1A in accordance with one embodiment of the invention.

The model used in Step 2 as shown in FIGS. 2A-2B is a special case in which the screen, projector and mirror are arranged in a straight line. However, apparently the model cannot be used directly in practice as the projector may block the rays reflected off the mirror. There is a need to move the projector away from the reflected rays while maintaining the optimal projector-mirror distance. Also, in some cases, if the projector and the screen are too close to each other or when their physical size is too large, they may collide. FIG. 3 illustrates the occlusion and collision constraints.

Rotate Projector about Mirror Center

Figure 5:
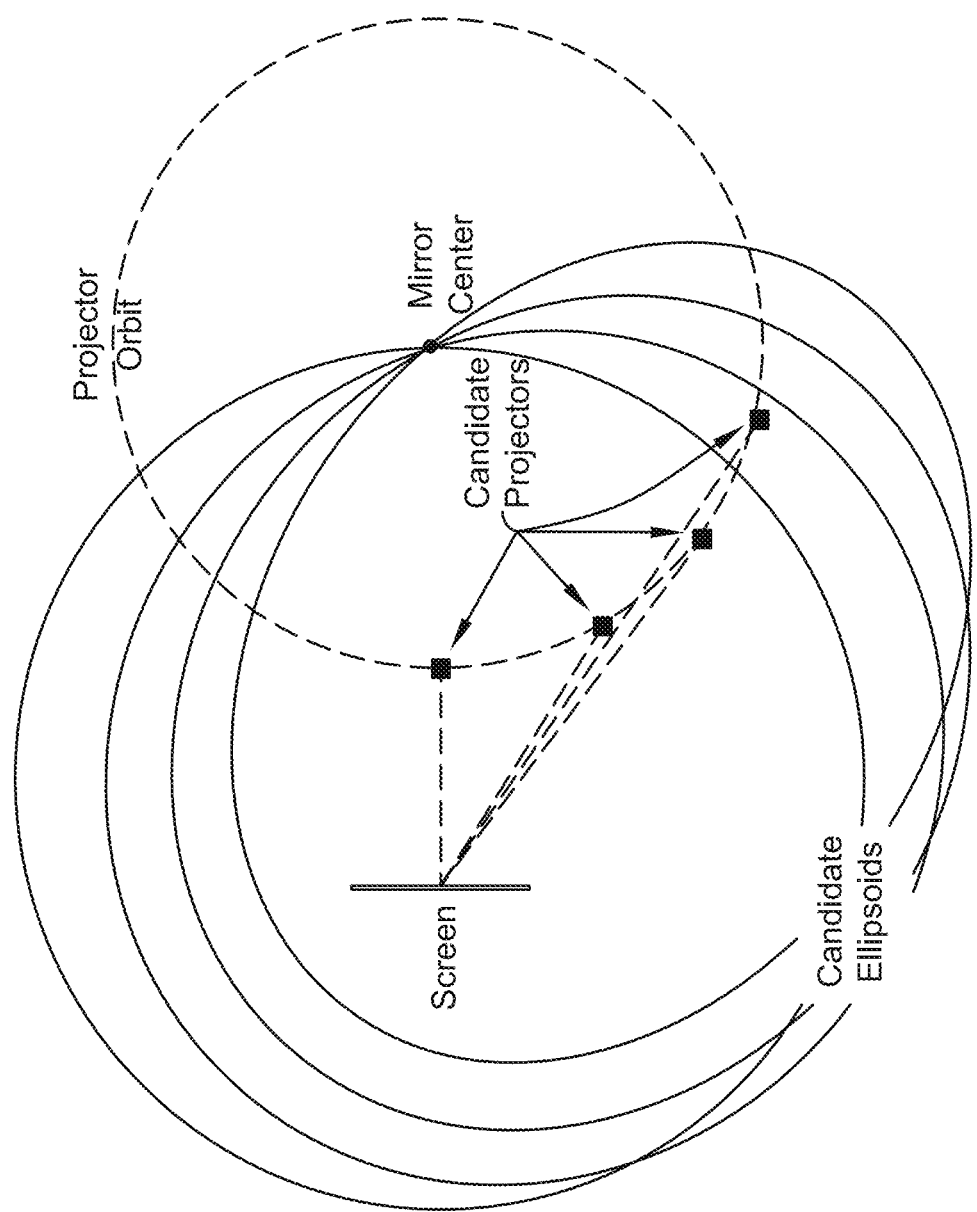
FIG. 5 is a schematic diagram illustrating a geometric relationship among the reflector, the display, and the projector in the autostereoscopic multi-view display system of FIG. 1A.

The middle dash circle in FIG. 2B illustrates the circular orbit of the projector for varying its pose while satisfying the condition of fully utilizing its pixel counts to achieve $\theta_d$. Therefore, one strategy to avoid the occlusion and collision issues is to rotate the projector about the mirror center. The amount of rotation should be made sufficient to avoid violating these constraints. FIGS. 3 and 4 shows a feasible pose of projector where its body does not block any rays or collide with the screen. In fact, as illustrated in FIG. 5, moving the projector along the circular orbit will obtain a system of candidate ellipsoids of uniform major axis d and different focal distance PS. All the candidate ellipsoids intersect at the mirror center.

However, since the rotation angle equals the projector's tilt angle, if the angle is very large, say 45 degrees, it may be difficult to set-up the system as current 4K projectors are still big and heavy. Therefore, the objective of the constrained optimization problem here is to minimize the projector tilt angle under the two hard constraints. As the projector's vertical FOV and the physical size of the screen and projector are known, the optimal projector tilt angle can be obtained easily by trigonometry. Consequently, the optimal ellipsoid with maximized pixel efficiency is obtained.

Step 4: Calculate System Configuration in Vertical Direction

Finally, by using $\theta_d$ the vertical parameters of the system can be calculated:

1. Number of rows of mirror array n (n ∈ Z) can be calculated by $$n = \left\lfloor \frac{\theta_d}{(m-1)\varphi} \right\rfloor$$

2. Then the vertical spatial resolution h=H/n
3. The vertical image size can be computed by $I_y = I_x h/w'$, where $I_x$ and w' are known vertical image size and corrected horizontal spatial resolution respectively.

Based on the above, all parameters of the system and the geometric model have been confirmed. Preferably the aspect ratio of the image is appropriate for projection, and it is possible to change the aspect ratio by adjusting either the angular resolution or the FOV.

Step 5: Design Mirror Array

The final step in the design pipeline is to precisely obtain the 3D structure of the mirror array for digital fabrication.

Intersection Surface of Ellipsoid and Projection Frustum

In the present embodiment, the mirror apparatus is a faceted ellipsoidal reflector. Each mirror is tangential to the optimal ellipsoid obtained in Step 3 at the mirror's center. Its boundary can be obtained by intersecting each tangential mirror plan and the frustum of the corresponding virtual projector, as shown in FIG. 1.

Interleave Light Field

The ellipsoidal model for mirror facet arrangement can efficiently proliferate m×n virtual projectors on a spherical surface (with center at the screen and radius equal to the major axis of the ellipsoid). Each virtual projector evenly shares the FOV of the projector. The projection frustum can be divided into m×n cells to find the center and corners of each mirror on the ellipsoid.

Figure 7:
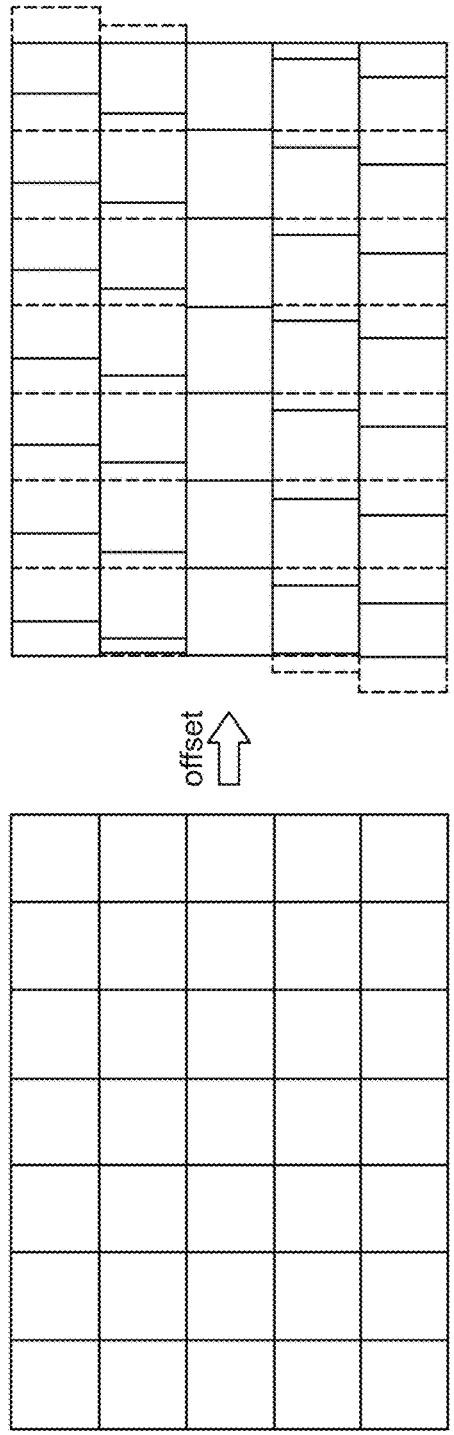
FIG. 7 is a schematic diagram illustrating offset of the reflector elements of the reflector in accordance with one embodiment of the invention.

It is also possible to utilize both horizontal and vertical pixels to interleave a large number of horizontal views in order to attain competitive angular resolution. In a preferred embodiment, multiple rows of mirror arrays are aligned to span the entire 2D pixel space while each row is offset horizontally with adjacent row with a uniform angular interval which equals to the display's target angular resolution $\varphi$, as shown in FIG. 7. By offsetting each row of mirrors horizontally with angular interval equal to the display's angular resolution $\varphi$, all virtual projectors can be distributed horizontally and evenly.

Due to the anisotropic diffusion property of the holographic screen (large vertical diffusion profile), the vertical positions and directions of the virtual projectors are irrelevant to the perceived multi-views. As such, the arrangement is equivalent to populating m×n (virtual) projectors horizontally and evenly along a circular curve at an angular spacing precisely equal to the angular resolution of the display because it defines the angular distance between two consecutive views.

Parametric Modelling and Fabrication of Mirror Array

The above-mentioned methodologies can be implemented using parametric modelling technique. A set of applications has been created using the 3D modelling software Rhino and its plugin Grasshopper. The developed tool allows users to configure the display specification by inputting the target parameters listed in Step 1. It then computes the remaining parameters based on the target parameters and check the size feasibility. The 3D models of all system components are automatically generated. Users can visualize and verify the system geometry interactively.

In one embodiment, the mirror array is fabricated using digital fabrication technologies because the geometric accuracy of the mirror apparatus is crucial for ensuring the display's performance. The parametric modelling tool can also automatically generate the necessary computer files for digital fabrication of the mirror array, which include the 3D model for printing the support structure of the mirror array, as well as the 2D vector file for cutting the glass mirrors with CNC machine. Finally, the mirrors are carefully attached, e.g., glued, to the 3D printed structure.

C. Calibration

Calibration is essential for the mirror array display system of the present embodiment. Unlike projector array, the display system in the present embodiment does not involve massive radiometric variations as only a single projector is used. However, despite the precise digital fabrication process, attachment of (e.g., by gluing) of individual mirrors may induce misalignments which will distort the image slices reflected on the screen and affect the display performance.

In one embodiment of the present invention, there is provided a fully automated calibration tool for correcting geometric deviations due to mirror misalignments. In this embodiment, as a number of mirrors are involved, an un-calibrated camera (e.g., web camera) is used in the loop to automate the calibration process.

Figure 10A:
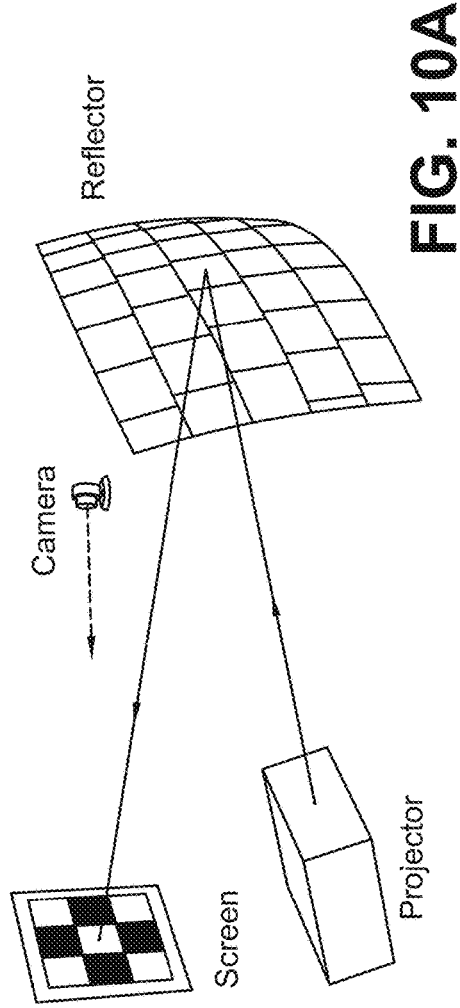
FIG. 10A is a schematic diagram of a calibration set-up for the autostereoscopic multi-view display system of FIG. 1A accordance with one embodiment of the invention.

A schematic calibration setup is shown in FIG. 10A. The set-up includes a projector, a reflector in the form of a mirror array, and a display screen. An un-calibrated calibration camera is arranged to capture image projected on the screen. Actual experimental set-ups are shown in FIGS. 13A and 13B.

Figure 13A:
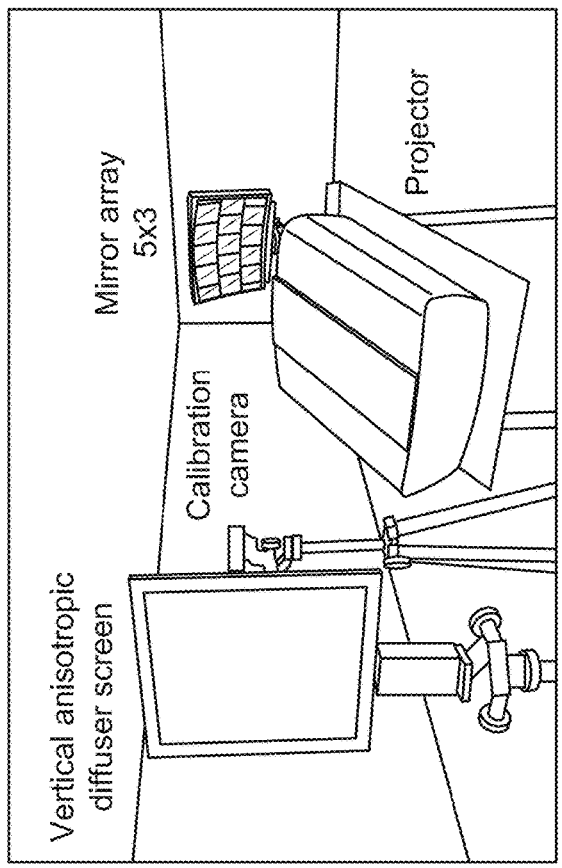
FIG. 13A illustrates simulated and real set-up for the autostereoscopic multi-view display system of FIG. 1 using the 5×3 mirror array of FIG. 12A.
Figure 13A:
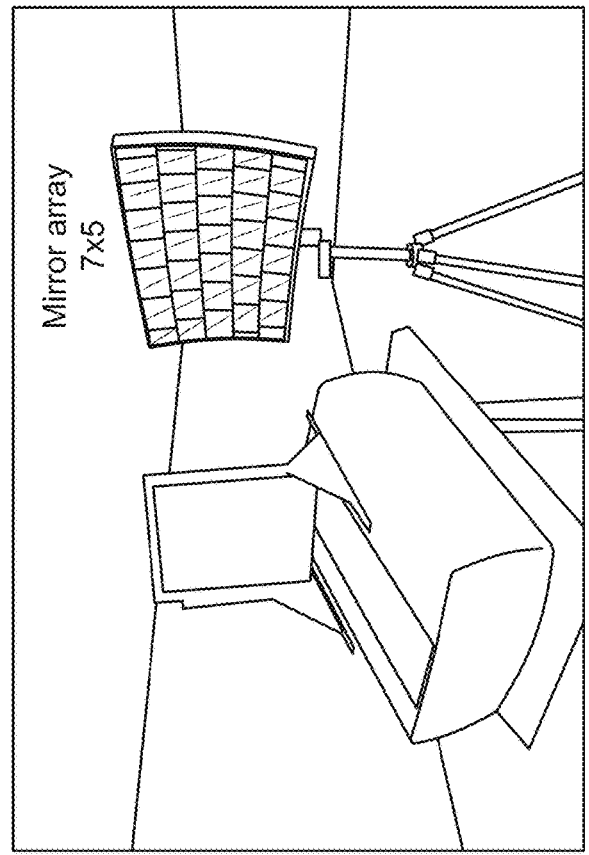
Figure 13A:
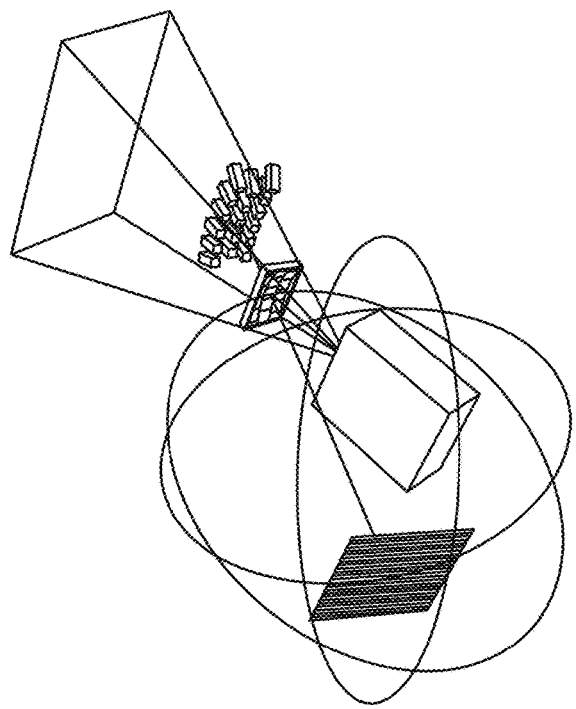
Figure 13B:
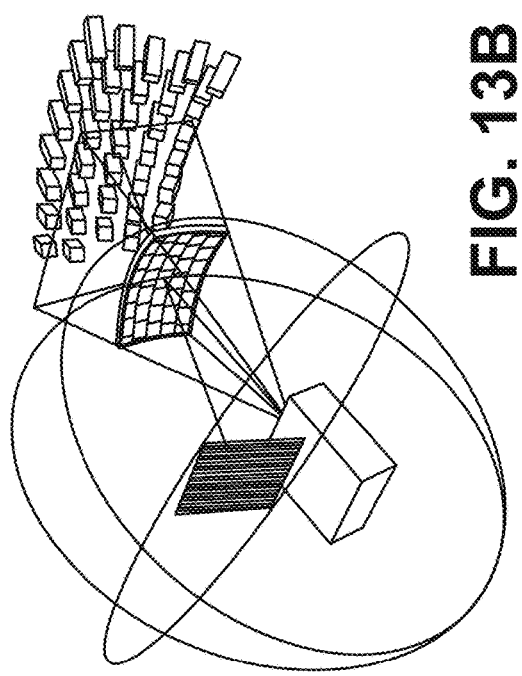
FIG. 13B illustrates simulated and real set-up for the autostereoscopic multi-view display system of FIG. 1 using the 7×5 mirror array of FIG. 12B.

As shown in FIG. 13A and 13B (for different mirror arrays), an un-calibrated calibration camera is arranged facing the rear side (opposite the user viewing side) of the holographic diffuser screen. A 2D rectification process similar to the described projector calibration method is applied to calibrate the projection image. A printed chessboard is attached to the projection and a reference image is taken as the benchmark for the following calibration. The purpose of the rectification process is to ensure all the projected sub-images will coincide with the reference image after calibration.

Then, a diffuse surface is placed in front of the screen and the same chessboard pattern is projected as a sub-image of the entire projection image onto each of the m×n mirrors sequentially. The calibration camera captures the distorted chessboard reflected off each mirror.

Figure 9:
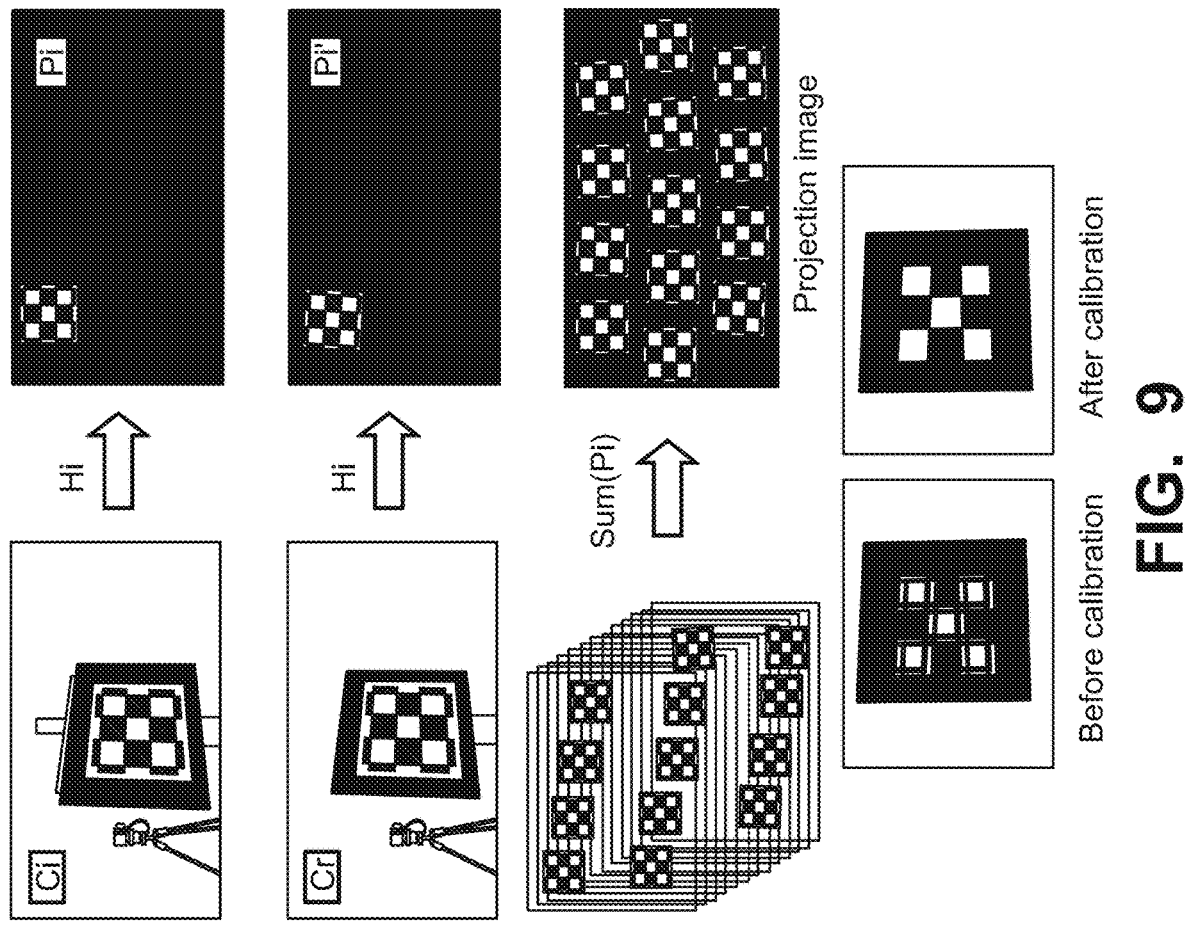
FIG. 9 are photographs and images illustrating a calibration process performed using the calibration set-up of FIG. 8 in accordance with one embodiment of the invention.
Figure 8:
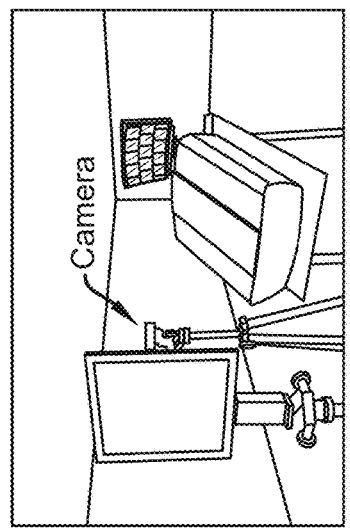
FIG. 8 is a photograph showing a calibration set-up for the autostereoscopic multi-view display system of FIG. 1A in accordance with one embodiment of the invention.

The homography between the projection sub-image plane and the calibration image plane is the key to calibrate the projection image. As shown in FIG. 9, the homography matrix $H_i$ between the calibration image plane $C_i$ and the sub-image plane $P_i$ is firstly calculated by using the correspondence between the detected corner points on the two images. As the homography between the reference calibration image $C_r$ and the projection sub-image $P_i$ is identical to the homography between $C_i$ and $P_i$. The calibrated sub-image $P_i'$ can be easily obtained by multiplying $C_r$ and $H_i$. The final calibrated projection image is obtained by adding all the calibrated sub-images $P_i'$; for i=1, 2, 3, . . . ,m×n, as shown in FIG. 9. The calibration results in FIG. 9 demonstrate high reliability of the proposed calibration method.

Figure 10B:
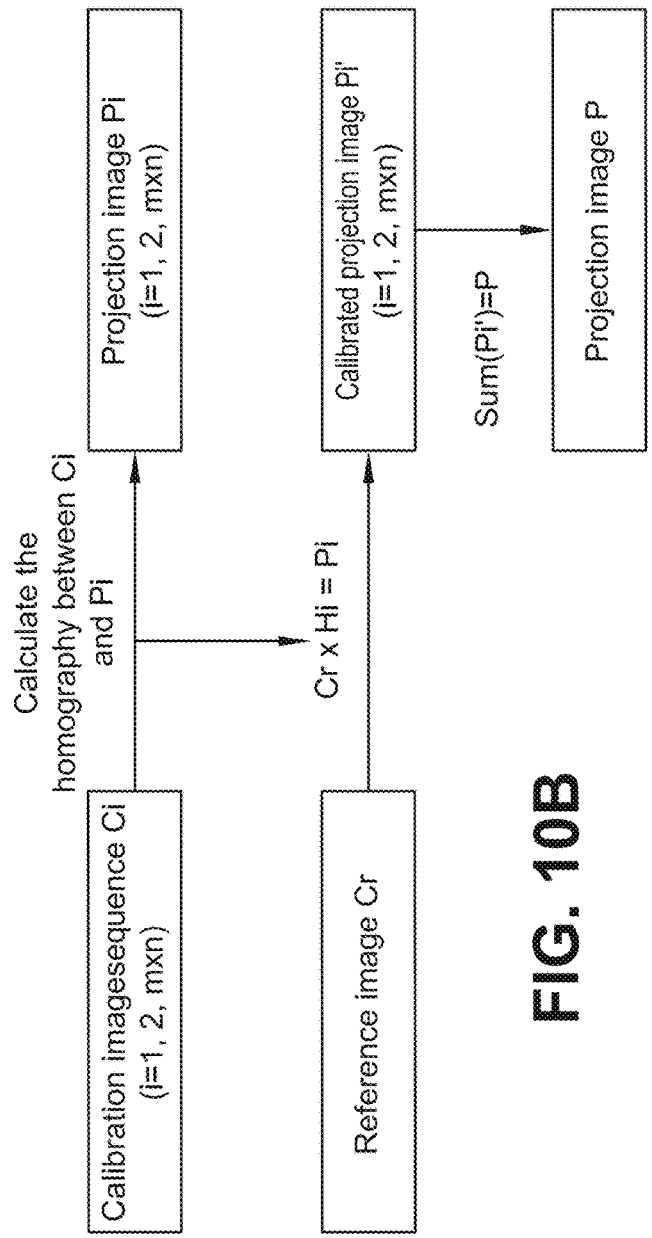
FIG. 10B is a flow diagram showing a method of calibrating the autostereoscopic multi-view display system of FIG. 1A in accordance with one embodiment of the invention.
Figure 11B:
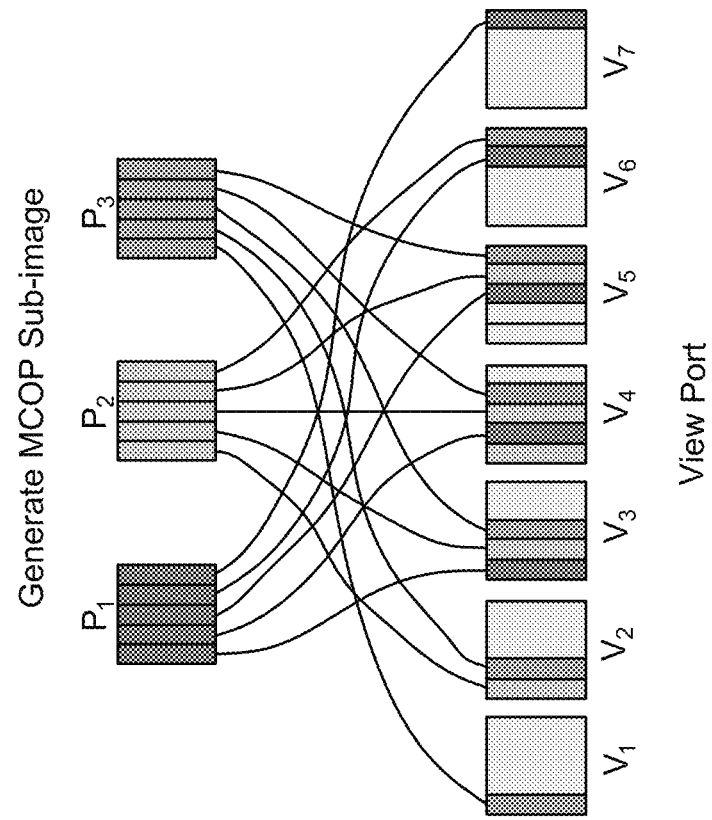
FIG. 11B illustrates multiple-center-of-projection (MCOP) image rendering method employed in accordance with one embodiment of the invention.
Figure 11A:
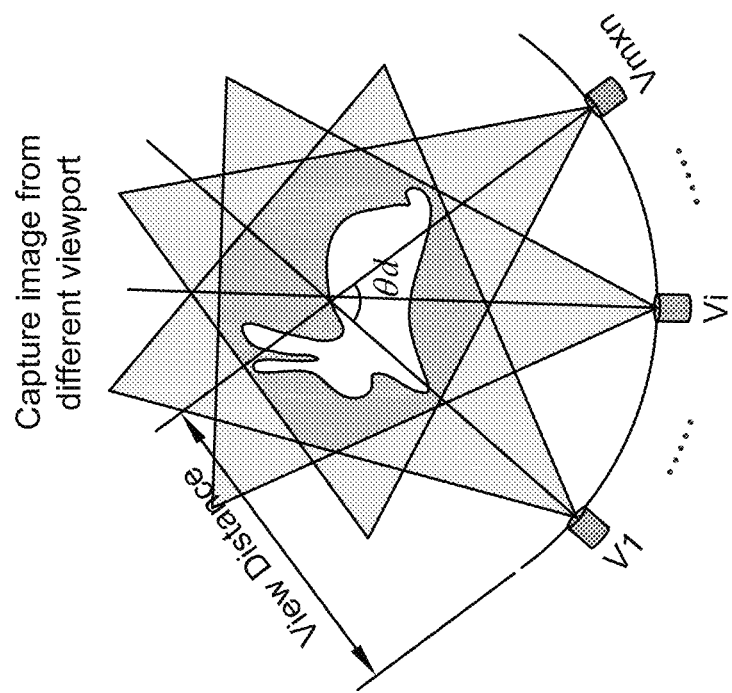
FIG. 11A illustrates multiple-center-of-projection (MCOP) image rendering method employed in accordance with one embodiment of the invention.
Figure 12B:
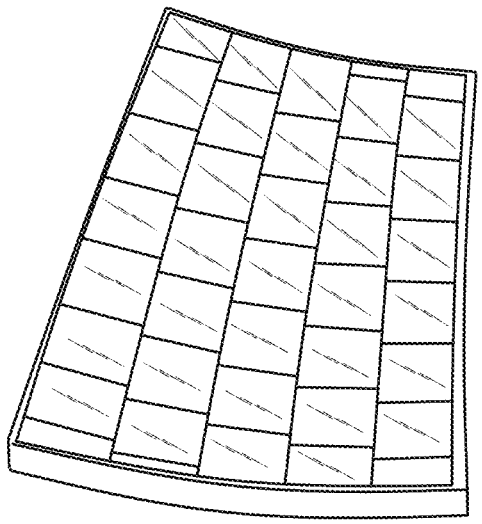
FIG. 12B illustrates a reflector in the form of a 7×5 mirror array in accordance with one embodiment of the invention.
Figure 12D:
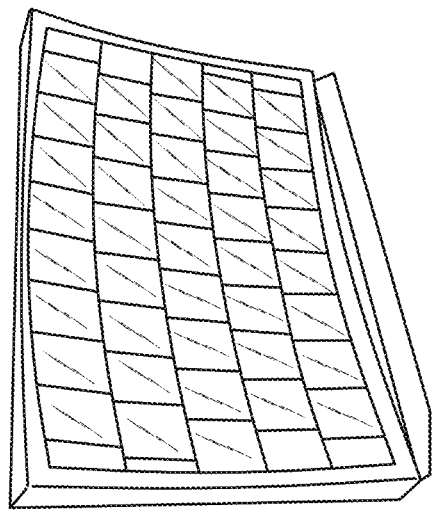
FIG. 12D illustrates a reflector in the form of a 9×5 mirror array in accordance with one embodiment of the invention.
Figure 12A:
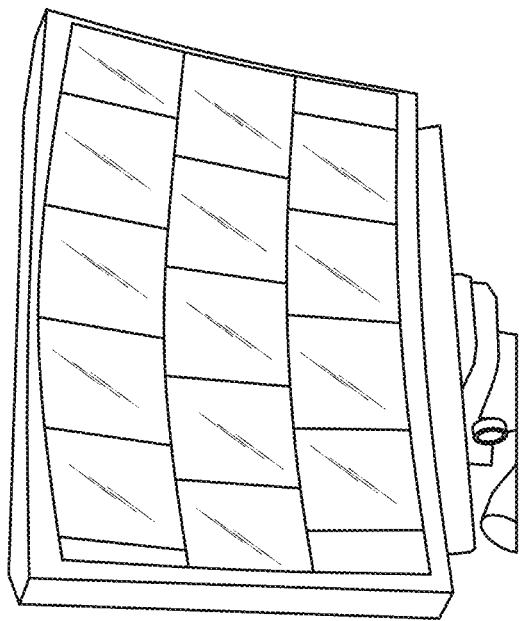
FIG. 12A illustrates a reflector in the form of a 5×3 mirror array in accordance with one embodiment of the invention.
Figure 12C:
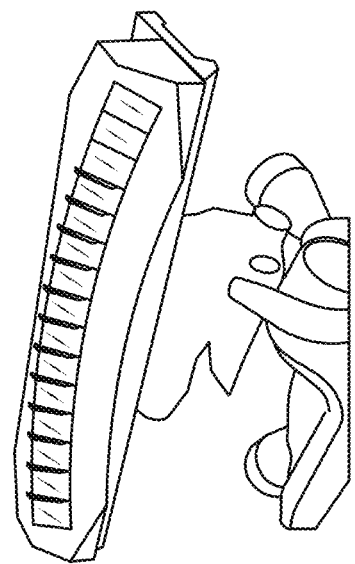
FIG. 12C illustrates a reflector in the form of a 15×1 mirror array in accordance with one embodiment of the invention.

FIG. 10B is a flow chart illustrating the corresponding calibration method used in this embodiment. The method includes (1) calculating a homography $H_i$ between the calibration images sequence $C_i$ and the projection sub-images $P_i$ using the correspondences between the detected corner points of the two sets of images; (2) obtaining calibrated sub-images $P_i'$ based on the calculated homography $H_i$ and the reference calibration images $C_r$; and (3) adding all calibrated sub-images $P_i'$ to obtain a final calibrated projection image.

D. Light Field Rendering

Similar to projector array systems, rendering for the display in the present embodiment requires MCOP rendering technique as different projector pixels diverge to different viewing positions. As suggested by its name, MCOP imagery is a single image that is captured from multiple centers. FIGS. 10A-10B illustrate the procedure of MCOP sub-image rendering used in this work, which is based on real viewing scenario.

As shown in FIG. 10A, the viewer positions are evenly distributed on the circular arc with radius equal to the viewing distance and center locating at the centre of 3D model. The gap between each view port can vary based on the trade-off between computational cost and performance. Generally, a large gap has lower computational cost but results in lower projection quality, whereas small gap has higher computational cost but yielding projection image of higher quality.

The rendered images from different viewing positions are then sliced into a number of image stripes which are mosaicked to generate a set of MCOP sub-images, as shown in FIG. 10B. The number of centres for each sub-image can be calculated based on the virtual projector number and the number of viewing positions.

E. Results

To verify the above, a number of reflector prototypes (in the form of mirror arrays) were built and tests were performed. In the tests, a 4K (3840×2160) projector with 40° horizontal FOV was used. A projector stand that can support a heavy projector tilting up to 60° was built. The vertical anisotropic screen used was 300×300 mm and was made with the elliptical Light Shaping Diffuser by Luminit, with 1° horizontal and 60° vertical diffusion profile. Four mirror arrays of various size and mirror numbers were designed and fabricated, as shown in FIGS. 11A-11D. The 3D models of the mirror support structures were generated in a parametric modelling tool. The structures were printed using SLA 3D printers with 0.1 mm precision. The modelling tool used also generated the 2D vector files of the mirror shapes. The files were used to cut the glass mirrors with CNC machine.

In the tests, performance of the 5×3 and 7×5 mirror arrays were studied as they have comparable specifications. Table 1 summarizes the parameters of these two setups.

TABLE 1

The system parameters of the 5 × 3 and 7 × 5 mirror array displays

| | Mirror Array m × n | |
|---|---|---|
| | 5 × 3 | 7 × 5 |
| Image Size $I_x \times I_y$ (mm) | 280 × 263 | 240 × 189 |
| Spatial Resolution w × h (pixel) | 768 × 720 | 549 × 432 |
| Pixel Density ρ (ppi) | 69.7 | 58.1 |
| Angular Resolution φ (deg) | 1 | 1 |
| Horizontal FOV $θ_d$ (deg) | 12 | 31 |
| Mirror Array Size $m_x \times m_y$ (mm) | 381 × 205 | 783 × 422 |
| Projection Distance (major axis) d (mm) | 2002 | 2404 |
| Focal Distance f (mm) | 1021 | 294 |

The system with the 5×3 mirror array has higher pixel density, spatial and angular resolution than 7×5, but it can only achieve 12° horizontal FOV. In fact, the ellipsoidal geometry used in the 5×3 prototype was not obtained using the design procedure mentioned above. Rather, the target horizontal FOV was not specified in the first place, but a feasible configuration with moderate mirror array size while giving a competitive angular resolution was tried to obtain. However, the narrow FOV limits the 3D sensation because viewers can gain motion parallax in a limited range. The proposed design approach was then used to redesign the mirror array with similar image size but a wider FOV of 31°. The wide range of viewable angle allows the display to successfully create convincing motion parallax. The system with 7×5 mirror array realize 31° viewer horizontal FOV, but the size of support structure reach 783×422 mm, which is nearly the maximum printing capability of commercialized 3D printer. The simulated geometric model and the actual experimental set-ups are shown in FIGS. 13A and 13B.

Figure 14:
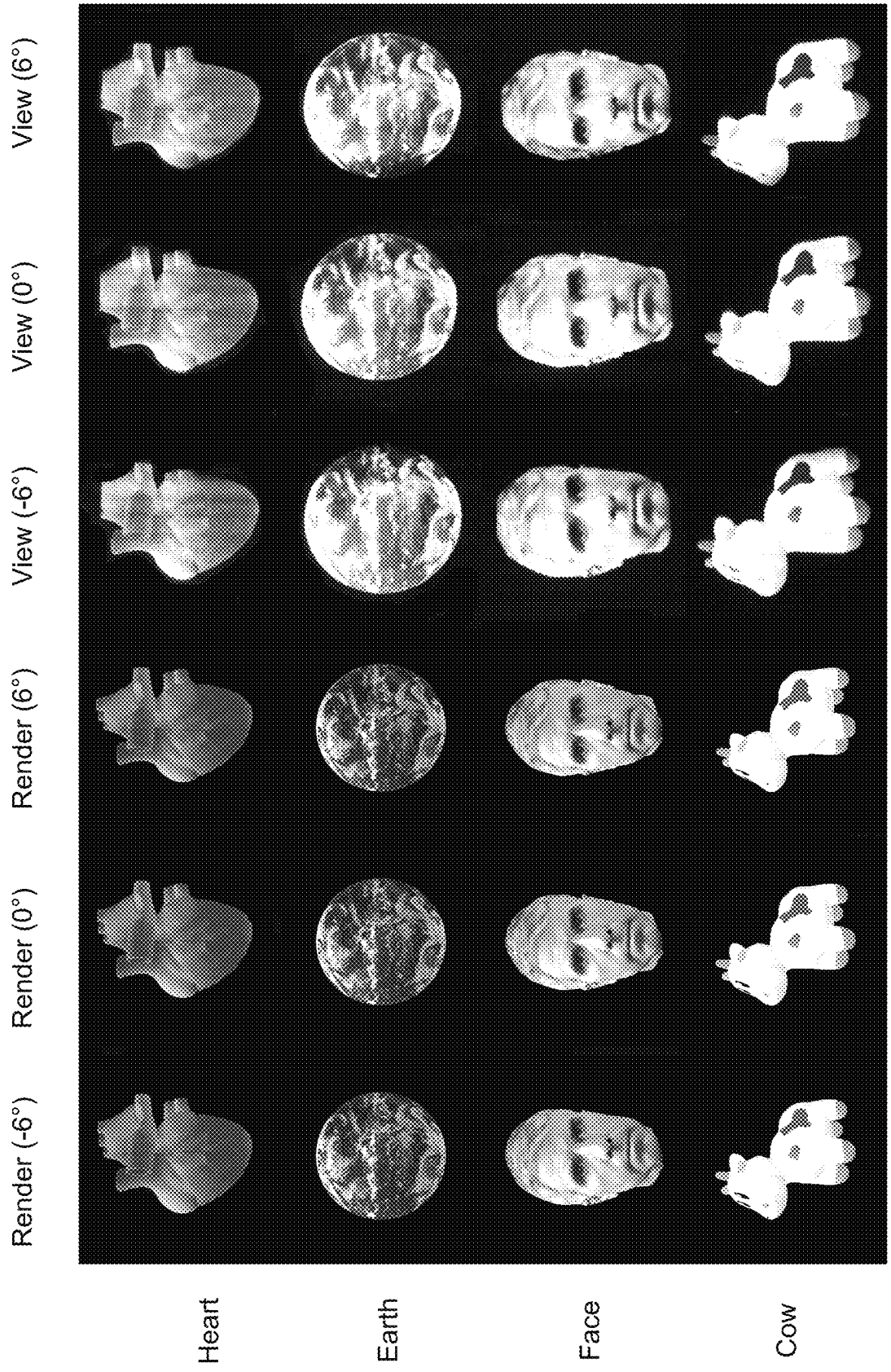
FIG. 14 are pictures showing 4 different 3D objects viewed from left to right using the system of FIG. 13A with 12° FOV.
Figure 15:
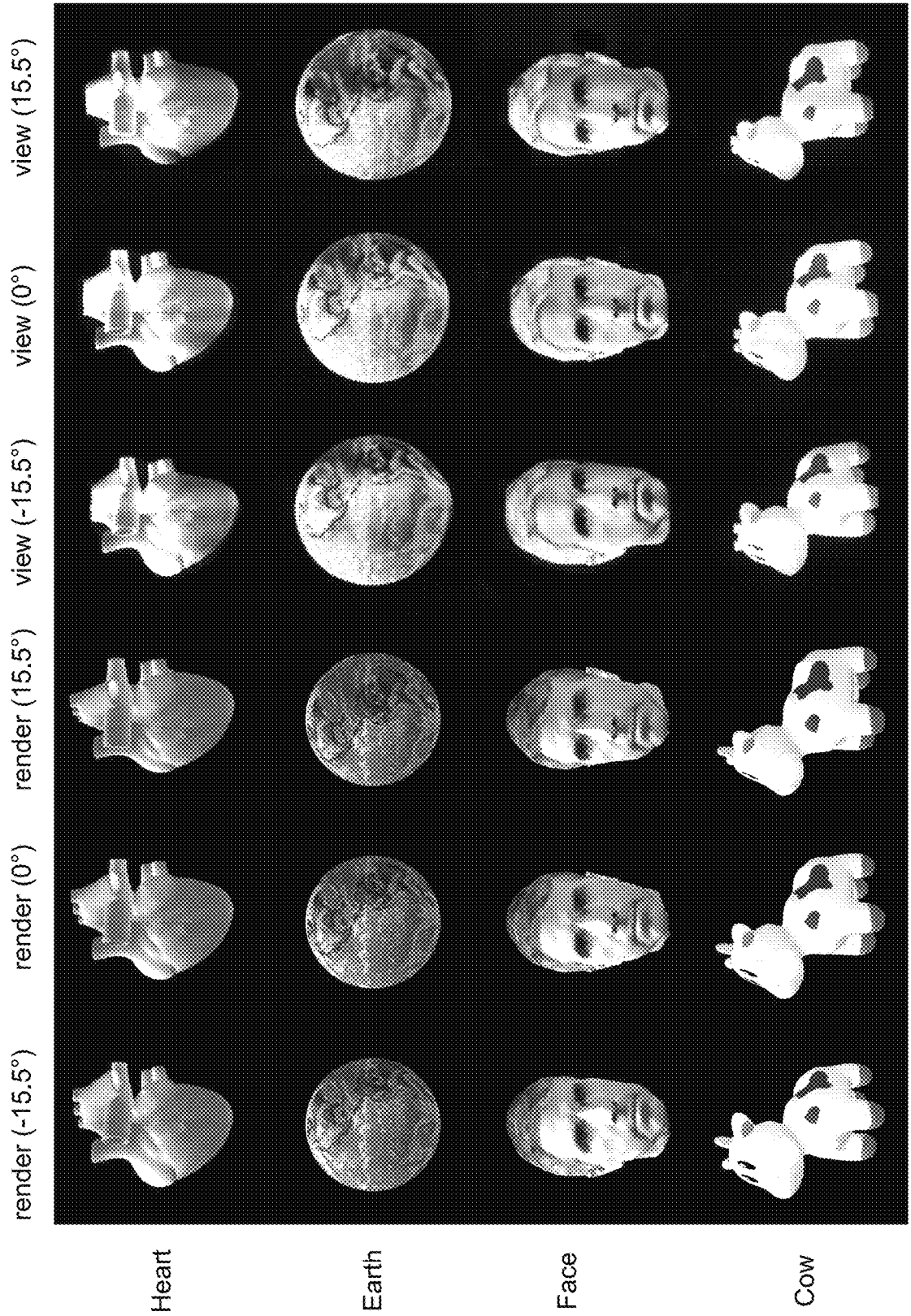
FIG. 15 are pictures showing 4 different 3D objects viewed from left to right using the system of FIG. 13B with 31° FOV.

As shown in FIGS. 14 and 15, four 3D models were displayed using the 5×3 and 7×5 mirror arrays respectively. The left three columns represent the rendered ground truth images from three view angles: −6°, 0° and +6° for the 12° FOV 5×3 display, −15.5°, 0° and +15.5° for the 31° FOV 7×5 display.

These results have verified that the mirror array approach and ellipsoidal geometry in the present embodiment can successfully create automultiscopic light field display using only one projector. These prototypes demonstrate that the design pipeline in the present embodiment can yield mirror array display with optimized specifications and all-rounded capabilities.

It should be appreciated that the autostereoscopic multi-view display system in the invention may utilize a different projector such as an image projector, a different display such as other anisotropic diffuser screen, and different reflector elements other than mirrors. For example, the reflector elements may be formed by a reflective film. In one embodiment, the mirrors need not be planar, but could be curved. The mirror elements can be formed separately or integrally.

Embodiments of the present invention provide a new reflector based autostereoscopic multi-view display system. In one embodiment a mirror array is used to redirect the pixels from a high-resolution projector into multi-views. Mirrors can easily reproduce densely arranged virtual projectors regardless of the physical size of the real projector, thus producing a display of high angular resolution that is unachievable by projector arrays. Embodiments of the invention also relates to an ellipsoidal model for positioning and arranging all system components and to design the mirror apparatus that can accurately redirect light from the projector while maintaining the angular divergence of different pixels to various views. Both horizontal and vertical pixels of the projector can be fully utilized to interleave a large number of horizontal views in order to attain competitive angular resolution. Methodologies have been developed to understand how different geometrical parameters affect each other and the display performance, and how to optimize these parameters under realistic constraints. These methodologies can be implemented with parametric modelling tools to automatically generate the optimized models for constructing mirror arrays by digital fabrication. Several prototypes of mirror array displays were built to verify and evaluate the proposed methodologies. Mirror array displays allow flexible trading between spatial and angular resolution to accommodate the needs of different applications, and provide a truly practical solution to realize projection based automultiscopic display.

The continuous growth of pixel counts and price reduction of high-resolution video projectors offer a great opportunity for achieving auto-multiscopy by dividing the projector resolution into multi-views. Reflectors such as mirrors provide a simple and effective way to accomplish the task. Also, mirrors can easily reproduce densely arranged virtual projectors independent of the physical size of the real projector, and this may provide a display of high angular resolution that is unachievable by existing projector arrays. Embodiments of the invention also provide a systematic solution to tackle the key challenge of mirror array display which is to properly design the mirror apparatus that can accurately redirect light from the projector while maintaining the angular divergence of different pixels to various views.

It will also be appreciated that where the methods and systems of the invention are either wholly implemented by computing system or partly implemented by computing systems then any appropriate computing system architecture may be utilized. This will include stand-alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. For example, the reflector can be any reflection elements, not necessarily mirror or planar mirror. The system 100 may be modified using multiple projectors and reflectors as shown in FIG. 16, while the operation principle remains largely the same. In FIG. 16, the system 200 includes three projectors 204A-204C, each arranged to project sub-images onto a reflector segment (mirror arrays) 202A-202C, for reflection onto a holographic diffuser display screen 206 for view by the user on the other side of the screen 206 (similar to that in FIGS. 1A-1C). In this embodiment, the projectors 204A-204C are each arranged at or close to a respective foci of the ellipsoid, and the mirror array reflector 202A-202C are each arranged tangential to an ellipsoid of revolution with the projector 204A-204C and the screen 206 center located at or close to its two respective focal points (foci). In the illustration, the major axis of the ellipsoid is upright but this is not essential. Like the embodiment of FIG. 1, in the system 200, the total length of any light ray emitted from a corresponding projector 204A-204C reflected off the corresponding mirror array reflector 202A-202C onto the screen 206, defined as the projection distance, is substantially constant. Unlike the embodiment in FIG. 1, planar mirrors 250A and 250B are provided to reflect light from the projectors 204A and 204C to the reflector 202A and 202C, to prevent interference of light rays from different projectors 204A-204C prior to reaching the reflectors 202A-202C. As a result, the light path from projector 204B to screen 206 is shorter than the light paths from respective projectors 204A, 204C to the screen 206 (due to the additional length of travel created by the planar mirrors 250A and 250B).

The present embodiments should, therefore, be considered in all respects as illustrative and not restrictive.

The invention claimed is:

1. An apparatus for an autostereoscopic multi-view display system, comprising:
    a reflector arranged to reflect light rays projecting from a projector onto a display for providing a multi-view image on the display, the reflector comprising a reflector array with a plurality of reflector elements, each arranged to reflect light rays projecting from the projector onto the display for providing a sub-image of the multi-view image, wherein the reflector array is a two-dimensional array with one or more rows and one or more columns, and
    wherein the number of columns m is determined based on $$m = \frac{W}{w'}$$

where W is a horizontal resolution of the projector and w' is horizontal spatial resolution of the display.

2. The apparatus of claim 1, wherein the reflector is arranged to provide a reflection surface that is shaped generally to correspond to a surface of an ellipsoid.

3. The apparatus of claim 1, wherein the reflector is arranged such that respective distances travelled by light rays from the projector via respective one of the reflector elements to the display are identical.

4. The apparatus of claim 1, wherein each of the reflector elements comprises a planar reflection surface.

5. The apparatus of claim 4, wherein the reflector is arranged such that the planar reflection surface of each of the reflector elements are each tangential to a surface of an ellipsoid, with the projector and the display arranged at a respective focal point of the ellipsoid.

6. The apparatus of claim 1, wherein each of the reflector elements comprises a curved reflection surface.

7. The apparatus of claim 6, wherein the reflector is arranged such that the curved reflection surface of each of the reflector elements is shaped to correspond to a surface of an ellipsoid with the projector and the display arranged at a respective focal point of the ellipsoid.

8. The apparatus of claim 4, wherein each of the reflector elements comprises a mirror.

9. The apparatus of claim 1, wherein the reflector array is a one-dimensional array with one row or one column.

10. The apparatus of claim 1, wherein the reflector array comprises a plurality of rows, each of which is offset with respect to the others.

11. The apparatus of claim 10, wherein the offset is equal to an angular resolution of the display.

12. The apparatus of claim 1, wherein the number of rows n is determined based on $$\varphi \leq \frac{\theta_d}{n(m-1)} \text{ and } n = \frac{H}{h}$$

where m is the number of columns, $\varphi$ is angular resolution of the display, $\theta_d$ is a horizontal FOV of the display, H is a vertical resolution of the projector, h is a vertical spatial resolution of the display.

13. The apparatus of claim 1, wherein the reflector elements are mirrors.

14. An autostereoscopic multi-view display system, comprising:
    a projector;
    a display; and
    a reflector arranged to reflect light rays projecting from the projector onto the display for providing a multi-view image on the display, the reflector comprising a reflector array with a plurality of reflector elements, each arranged to reflect light rays projecting from the projector onto the display for providing a sub-image of the multi-view image,
    wherein the reflector, the projector, and the display are arranged such that respective distances travelled by light rays from the projector via respective one of the reflector elements to the display are identical, and
    wherein the distance d travelled by light rays from the projector via the reflector element to the display is defined by:

$$d = \frac{x}{2\tan(\theta_p/2m)}$$

where x is a horizontal size of the display defined by a horizontal spatial resolution of the display divided by pixel density of the display, m is the number of columns of the reflector array, $\theta_p$ is a horizontal FOV of the projector.

15. The autostereoscopic multi-view display system of claim 14, wherein each of the reflector elements comprises a planar reflection surface; and the reflector is arranged such that the planar reflection surface of each of the reflector elements are each tangential to a surface of an ellipsoid, with the projector and the display arranged at a respective focal point of the ellipsoid.

16. The autostereoscopic multi-view display system of claim 14, wherein each of the reflector elements comprises a curved reflection surface; and wherein the reflector is arranged such that the curved reflection surface of each of the reflector elements is shaped to correspond to a surface of an ellipsoid with the projector and the display arranged at a respective focal point of the ellipsoid.

17. The autostereoscopic multi-view display system of claim 14, wherein the reflector array is:
    a one-dimensional array with one row or one column; or
    a two-dimensional array with one or more rows and one or more columns.

18. The autostereoscopic multi-view display system of claim 14, wherein the reflector array comprises a plurality of rows, each of which is offset with respect to the others; and the offset is equal to an angular resolution of the display.

19. The autostereoscopic multi-view display system of claim 17, wherein the number of columns m is determined based on $$m = \frac{W}{w'}$$

where W is a horizontal resolution of the projector and w' is horizontal spatial resolution of the display; and
wherein the number of rows n is determined based on $$\varphi \leq \frac{\theta_d}{n(m-1)} \text{ and } n = \frac{H}{h}$$

where m is the number of columns, φ is angular resolution of the display, $\theta_d$ is a horizontal FOV of the display, H is a vertical resolution of the projector, h is a vertical spatial resolution of the display.

20. The autostereoscopic multi-view display system of claim 14, wherein the reflector elements are mirrors.

21. The autostereoscopic multi-view display system of claim 14, wherein the reflector is arranged to provide a reflection surface that is shaped generally to correspond to a surface of an ellipsoid.

22. The autostereoscopic multi-view display system of claim 14, wherein the display comprises a screen with an anisotropic diffuser.

23. The autostereoscopic multi-view display system of claim 22, wherein the anisotropic diffuser comprises a vertical anisotropic diffuser.

24. The autostereoscopic multi-view display system of claim 14, wherein the projector comprises a high resolution video projector.

25. An autostereoscopic multi-view display system, comprising:
  a projector;
  a display; and
  a reflector arranged to reflect light rays projecting from the projector onto the display for providing a multi-view image on the display, the reflector comprising a reflector array with a plurality of reflector elements, each arranged to reflect light rays projecting from the projector onto the display for providing a sub-image of the multi-view image,
  wherein the reflector array is a two-dimensional array with one or more rows and one or more columns,
  wherein the number of columns m is determined based on $$m = \frac{W}{w'}$$

where W is a horizontal resolution of the projector and w' is horizontal spatial resolution of the display; and
wherein the number of rows n is determined based on $$\varphi \leq \frac{\theta_d}{n(m-1)} \text{ and } n = \frac{H}{h}$$

where m is the number of columns, φ is angular resolution of the display, $\theta_d$ is a horizontal FOV of the display, H is a vertical resolution of the projector, h is a vertical spatial resolution of the display.

26. A method for calibrating the autostereoscopic multi-view display system of claim 25, the method comprising:
  (a) imaging, using a camera, a printed image arranged on the display for use as a reference image;
  (b) projecting, using the projector, an image identical to the printed image for reflection by the reflector onto the display;
  (c) imaging, using the camera, the projected image;
  (d) determining a homography between the reference image and the projected image imaged by the camera; and
  (e) determining a calibrated projection image for projection using the autostereoscopic multi-view display system based on the determined homography.

27. The method of claim 26,
  wherein step (b) comprises sequentially projecting the image identical to the printed image to each of the reflector elements.

28. The method of claim 27, wherein step (d) comprises: calculating a homography matrix between the reference image and the images based on correspondence between the detected corner points on the two sets of images.

29. The method of claim 27, wherein step (e) comprises: multiplying the reference image and the determined homography to obtain calibrated images corresponding to the imaged images.

30. The method of claim 29, wherein step (e) further comprises: adding all calibrated images to obtain the calibrated projection image.

* * * * *